United States Patent
Chillar et al.

(10) Patent No.: US 7,866,140 B2
(45) Date of Patent: *Jan. 11, 2011

(54) CONTROL SYSTEM FOR AN EGR PURGE SYSTEM

(75) Inventors: Rahul J. Chillar, Greenville, SC (US);
Joell R. Hibshman, II, Greer, SC (US);
Dale J. Davis, Marietta, GA (US);
Douglas E. Dean, Greer, SC (US)

(73) Assignee: General Electric Company, Schenectady, NY (US)

( * ) Notice: Subject to any disclaimer, the term of this patent is extended or adjusted under 35 U.S.C. 154(b) by 360 days.

This patent is subject to a terminal disclaimer.

(21) Appl. No.: 11/956,512

(22) Filed: Dec. 14, 2007

(65) Prior Publication Data
US 2009/0151353 A1 Jun. 18, 2009

(51) Int. Cl.
*F02G 1/00* (2006.01)
*F02G 3/00* (2006.01)
*F02M 25/07* (2006.01)
*F02M 25/06* (2006.01)

(52) U.S. Cl. .................. 60/39.52; 60/39.45; 60/39.12; 60/605.2; 60/278; 123/568.12; 123/568.15

(58) Field of Classification Search ................ 60/605.2, 60/278–279, 310, 311, 39.52, 678, 39.12, 60/39.46; 123/568.12, 568.15; *F02M 25/07*
See application file for complete search history.

(56) References Cited

U.S. PATENT DOCUMENTS

| | | | | |
|---|---|---|---|---|
| 3,866,411 A * | 2/1975 | Marion et al. | ............... | 60/39.52 |
| 4,184,322 A * | 1/1980 | Paull et al. | ................. | 60/39.12 |
| 4,215,550 A * | 8/1980 | Dinger et al. | ............... | 60/605.2 |
| 4,942,921 A * | 7/1990 | Haessig et al. | .............. | 165/214 |
| 5,096,470 A * | 3/1992 | Krishnamurthy | ............. | 95/102 |
| 5,426,936 A * | 6/1995 | Levendis et al. | ............... | 60/278 |
| 5,457,958 A * | 10/1995 | Boegner et al. | ............... | 60/279 |
| 5,592,925 A * | 1/1997 | Machida et al. | ............... | 60/311 |
| 5,669,365 A * | 9/1997 | Gartner et al. | ......... | 123/568.12 |
| 5,794,431 A * | 8/1998 | Utamura et al. | ........... | 60/39.52 |
| 5,974,802 A * | 11/1999 | Blake | ........................ | 60/605.2 |
| 6,202,400 B1 * | 3/2001 | Utamura et al. | ........... | 60/39.52 |
| 6,282,883 B1 * | 9/2001 | Uematsu et al. | ........... | 60/39.52 |
| 6,295,815 B1 * | 10/2001 | Bechle et al. | ............. | 60/605.2 |
| 6,484,703 B1 * | 11/2002 | Bailey | .................. | 123/568.15 |
| 6,526,753 B1 * | 3/2003 | Bailey | ....................... | 60/605.2 |
| 6,622,470 B2 * | 9/2003 | Viteri et al. | ................ | 60/39.52 |
| 6,637,183 B2 * | 10/2003 | Viteri et al. | ................ | 60/39.52 |

(Continued)

FOREIGN PATENT DOCUMENTS

JP 57073827 A * 5/1982 ................ 60/39.52

(Continued)

Primary Examiner—Thai Ba Trieu
(74) Attorney, Agent, or Firm—Dale J. Davis; Ernest G. Cusick; Frank A. Landgraff

(57) ABSTRACT

The exhaust within an exhaust gas recirculation (EGR) system should be purged to allow for access to the components of the EGR system. A method and system for controlling an EGR purge system is provided. The method and system may control the operation of drawing the exhaust out of the EGR system. The method may also control the operation of diving the exhaust out of the EGR system.

20 Claims, 5 Drawing Sheets

U.S. PATENT DOCUMENTS

| | | | | |
|---|---|---|---|---|
| 6,824,710 | B2 * | 11/2004 | Viteri et al. | 60/39.461 |
| 6,910,335 | B2 * | 6/2005 | Viteri et al. | 60/39.52 |
| 6,964,158 | B2 * | 11/2005 | Abdul-Khalek | 60/278 |
| 7,634,915 | B2 * | 12/2009 | Hoffmann et al. | 60/39.12 |
| 7,739,864 | B2 * | 6/2010 | Finkenrath et al. | 60/39.52 |
| 2008/0010967 | A1 * | 1/2008 | Griffin et al. | 60/39.52 |
| 2009/0218821 | A1 * | 9/2009 | Elkady et al. | 60/39.52 |

FOREIGN PATENT DOCUMENTS

JP      2002332919 A   * 11/2002

* cited by examiner

CONTROL SYSTEM FOR AN EGR PURGE SYSTEM

This application is related to commonly-assigned U.S. patent application Ser. No. 11/928,038, filed Oct. 30, 2007; U.S. patent application Ser. No. 11/936,996, filed Nov. 8, 2007; and U.S. patent application Ser. No. 11/939,709, filed Nov. 14, 2007.

The present invention relates to an exhaust gas recirculation (EGR) system for a turbomachine, and more particularly to a system for purging the exhaust gas from the EGR.

There is a growing concern over the long-term effects of Nitrogen Oxides (hereinafter NOx), Carbon Dioxide (hereinafter "$CO_2$") and Sulfur Oxides (SOx) emissions on the environment. The allowable levels of those emissions that may be emitted by a turbomachine, such as a gas turbine, are heavily regulated. Operators of turbomachines desire methods of reducing the levels of NOx, $CO_2$, and SOx emitted.

Significant amounts of condensable vapors exist in the exhaust gas stream. These vapors usually contain a variety of constituents such as water, acids, aldehydes, hydrocarbons, sulfur oxides, and chlorine compounds. Left untreated, these constituents will accelerate corrosion and fouling of the internal components if allowed to enter the gas turbine.

Exhaust gas recirculation (EGR) generally involves recirculating a portion of the exhaust through an inlet portion of the turbomachine where it is mixed with the incoming airflow prior to combustion. This process facilitates the removal and sequestration of concentrated $CO_2$, and may also reduce NOx and SOx emissions.

Access to the EGR system components may be necessary for maintenance, inspection, repair, or other purposes. The exhaust should be purged from the EGR system: prior to access; when the EGR system is not in use; or when the turbomachine is not generating exhaust. Furthermore, remnants of the exhaust that are not purged may condense within the EGR system leading to the corrosion of the components.

For the foregoing reasons, there is a need for a method and system for controlling an EGR purge system. After use, the method and system should allow for access to the components of EGR system, and reduce the possibility of corrosion of the components.

BRIEF DESCRIPTION OF THE INVENTION

In accordance with an embodiment of the present invention, a method of purging an exhaust stream from at least one exhaust gas recirculation (EGR) system, wherein the exhaust stream exits a turbomachine; the method comprising: providing at least one EGR system comprising: a first zone, a second zone; an EGR skid, an EGR inlet damper, and an EGR outlet damper; wherein the at least one EGR system reduces the level of at least one constituent within the exhaust stream; providing an EGR purge system for purging the exhaust stream from the EGR system, the EGR purge system comprising: at least one first purge flow modulation device located within the first zone, and at least one second purge flow modulation device located within the second zone; establishing a pressure differential between the first zone and second zone; modulating at least one of the at least one first purge flow modulation device and the at least one second purge flow modulation device to allow for the exhaust stream exit the at least one EGR system; and determining whether the exhaust stream is within a range.

In accordance with an alternate embodiment of the present invention, a system for purging an exhaust stream from at least one exhaust gas recirculation (EGR) system, wherein the exhaust stream exits a turbomachine; the system comprising: at least one EGR system comprising: a first zone, a second zone; an EGR skid, an EGR inlet damper, and an EGR outlet damper; wherein the at least one EGR system reduces the level of at least one constituent within the exhaust stream; an EGR purge system for purging the exhaust stream from the EGR system, the EGR purge system comprising: at least one first purge flow modulation device located within the first zone, and at least one second purge flow modulation device located within the second zone; a control system, wherein the control system comprises at least one processor, wherein the at least one processor operates the EGR purge system to: establish a pressure differential between the first zone and second zone; modulate at least one of the at least one first purge flow modulation device and the at least one second purge flow modulation device to allow for the exhaust stream exit the at least one EGR system; and determine whether the exhaust stream is within a range.

DETAILED DESCRIPTION OF THE INVENTION

Figure 1:
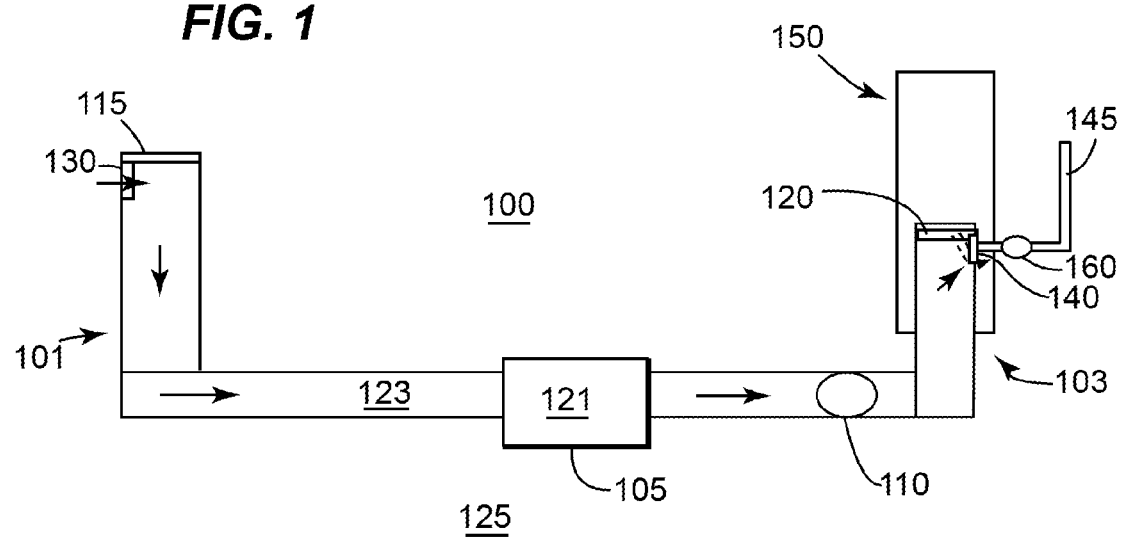
FIG. 1 is a schematic illustrating an example of a system for purging an exhaust stream in accordance with a first embodiment of an EGR purge system.

The following detailed description of preferred embodiments refers to the accompanying drawings, which illustrate specific embodiments of the invention. Other embodiments having different structures and operations do not depart from the scope of the present invention.

Certain terminology may be used herein for the convenience of the reader only and is not to be taken as a limitation on the scope of the invention. For example, words such as "upper," "lower," "left," "right," "front", "rear" "top", "bottom", "horizontal," "vertical," "upstream," "downstream," "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

The present invention may be applied to the variety of turbomachines that produce a gaseous fluid, such as, but not limiting of, a heavy-duty gas turbine; an aero-derivative gas turbine; or the like. An embodiment of the present invention may be applied to either a single turbomachine or a plurality of turbomachines. An embodiment of the present invention may be applied to a turbomachine operating in a simple cycle or a combined cycle configuration.

An EGR system receives a portion of the exhaust (hereinafter "exhaust stream") from a turbomachine, reduces the level of the aforementioned constituents within the exhaust stream, and then recirculates the exhaust stream to an inlet section of the turbomachine. This process facilitates the removal and sequestration of concentrated $CO_2$.

The exhaust stream in the EGR system should be purged when for example, but not limiting of: a) the EGR system may not be in use; b) the turbomachine has tripped or performed a fired shutdown; c) when an operator seeks to access the components of the EGR for repair, inspection, or maintenance; or d) for any other reason when the exhaust stream should be purged. The exhaust stream existing within the EGR system may need to be purged for a variety reasons, such as, but not limiting of, when an operator may need to access the EGR system components for inspection, repair, service, or the like.

Generally, the EGR purge system comprises multiple components. The configuration and sequence of the components may be dictated by the configuration of the turbomachine integrated with the EGR system. In general, the EGR purge system displaces the exhaust stream in the EGR loop with a benign fluid, such as, but not limiting of, ambient air. As described below, there are multiple arrangements that may be used to accomplish the purging of the exhaust stream.

The elements of the EGR purge system may be fabricated of any materials that can withstand the operating environment under which the EGR purge system may function and operate. These elements include for example, but not limiting of, a first purge flow modulation device, a second purge flow modulation device, an EGR purge blower, and an EGR purge fan.

Referring now to the Figures, where the various numbers represent like elements throughout the several views, FIG. 1 is a schematic illustrating an example of a system for purging an exhaust stream in accordance with a first embodiment of an EGR purge system 125. FIG. 1 illustrates an EGR system 100, and an EGR purge system 125.

The EGR system 100, as illustrated in FIG. 1, comprises: a first zone 101, a second zone 103, an EGR skid 105, an EGR fan 110 an EGR inlet damper 115, and an EGR exhaust damper 120, that may be integrated with an exhaust section 150 of the turbomachine 147 (not illustrated in FIG. 1).

The at least one EGR system 100 may be of a size and fabricated of a material capable of withstanding the physical properties of the exhaust stream 121, such as, but not limiting of, a flowrate of about 1,000 Lb/hr to about 50,000,000 Lb/hr and a temperature of about 50 Degrees Fahrenheit to about 1500 Degrees Fahrenheit.

The flow path 123 of the EGR system 100 may be bounded by the inlet section 149 (not illustrated in FIG. 1) and the exhaust section 150. The inlet section may include a compressor, or the like.

The first zone 101 may be considered the section of the EGR system 100 located near an inlet section 149 of the turbomachine 147. The second zone 103 may be considered the section of the EGR system 100 located near the exhaust section 150 of the turbomachine 147.

The EGR skid 105 generally includes the component (s) of the EGR system 100 that reduces the level of aforementioned constituents from the exhaust stream 121. These component (s) may include at least one heat exchanger, at least one scrubber, at least one demister, or similar components, (none of which are illustrated in the Figures). The EGR fan 110 may circulate the exhaust during the operation of the EGR system 100.

Generally, during the operation of the EGR system 100, the EGR exhaust damper 120 may open to allow for the at least one exhaust stream 121 from the exhaust section 150 of the turbomachine 147 to enter the EGR second zone 103. Then, the EGR skid 105 may reduce the level of constituents within the exhaust stream 121. Next, the EGR inlet damper 115 may open to allow for the recirculated exhaust stream 121 to enter the inlet section 149 of the turbomachine 147.

The EGR system 100 should be purged when not in use, such as, but not limiting of, when the turbomachine 147 is not producing exhaust gases. When the EGR system 100 is not use, the inlet and exhaust dampers 115,120, may be shut; the EGR fan 110 may be off; and the EGR skid 105 may not be operating. These conditions may allow for the EGR system 100 to become a contained vessel, or the like, with the exhaust stream 121 inside. Therefore, the exhaust stream 121 should be purged from the EGR system 100.

The benefits of purging the EGR system 100 may include for example, but not limiting of, allowing for inspection, service, or repair of the aforementioned components within the EGR system 100. An EGR purge system 125 may include components that allow for the exhaust to leak out of the EGR system 100, thereby preventing the EGR system 100 from becoming a contained vessel when not in use.

Purging may also be beneficial for preventing corrosion from occurring within the EGR system 100. The exhaust stream 121 that remains within when the EGR system 100 is not in use, may eventually condense, possibly leading to an acid formation and/or liquid formation, within the EGR system 100.

The EGR purge system 125 may also be used when a failure of a component (s) prevents the circulation of the exhaust stream 121 within the EGR system 100. Here, the EGR purge system 125 may remove the exhaust stream 121 from the EGR system 100.

The EGR purge system 125 may generally include a source of air for removing the exhaust stream 121. The source of air may include at least one of: an EGR purge fan 160, an at least one EGR purge blower 155, the turbomachine 147, and combinations thereof.

The EGR purge system 125, as illustrated in FIG. 1, comprises: at least one first purge flow modulation device 130), at least one second purge flow modulation device 140, at least one second purge vent 145, and at least one EGR purge fan 160.

The positioning of the EGR purge system 125 components may ensure that the flow path 123 defined by the inlet section 149 and exhaust section 150 of the turbomachine 147, as discussed, is purged. As illustrated in FIG. 1, the at least one first purge flow modulation device 130 may be located within the first zone 101; and the at least one second purge flow modulation device 140 may be located within the second zone 103. The locations of the at least one first purge flow modulation device 130 and the at least one second purge flow modulation device 140 may allow for the purging of the EGR system 100 flow path 123; and also allow for a pressure balance between the first and second zones 101,103.

The at least one first purge flow modulation device 130 and the at least one second purge flow modulation device 140, may be a damper, vent, or other similar device (s). The at least one first purge flow modulation device 130 may allow for the ambient air (or the like) to enter the EGR system 100. The at least one second purge flow modulation device 140 may allow for the exhaust stream 121 to flow out of the EGR system 100.

The at least one EGR purge fan 160 may draw the exhaust stream 121 out through the second purge vent 145. A downstream end of the second purge vent 145 may be open to atmosphere. Alternatively, the downstream end of the second purge vent 145 may be integrated with a system, such as, but not limiting of, a ventilation system that may receive the exhaust being purged from the EGR system 100.

Figure 2:
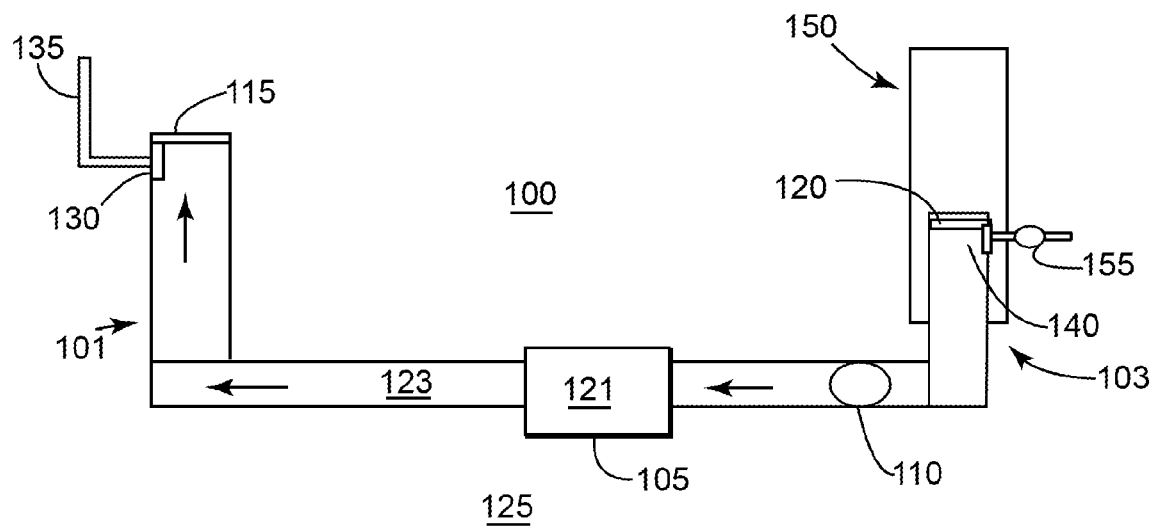
FIG. 2 is a schematic illustrating an example of a system for purging an exhaust stream in accordance with a second embodiment of an EGR purge system.

FIG. 2 is a schematic illustrating an example of a system for purging an exhaust stream 121 in accordance with a second embodiment of an EGR purge system 125. As illustrated in FIG. 2, the primary difference between this second embodiment and the first embodiment is the manner used for purging the exhaust stream 121 from the EGR system 100. In this second embodiment, the EGR purge system 125, as illustrated in FIG. 2, comprises: at least one first purge flow modulation device 130, at least one first purge vent 135, at least one second purge flow modulation device 140, and at least one EGR purge blower 155.

The positioning of the EGR purge system 125 components may ensure that the flow path 123 defined by the inlet section 149 and exhaust section 150 of the turbomachine 147 is purged, as discussed. As illustrated in FIG. 2, the at least one first purge flow modulation device 130 may be located within the first zone 101; and the at least one second purge flow modulation device 140 may be located within the second zone 103. The locations of the at least one first purge flow modulation device 130 and the at least one second purge flow modulation device 140 may be advantageous, as described.

The at least one first purge flow modulation device 130 and the at least one second purge flow modulation device 140, may be in the form of a damper, vent, or other device (s), as described. In this second embodiment, the at least one first purge flow modulation device 130, may be integrated with the at least one first purge vent 135, allowing for the exhaust stream 121 to be purged out of the EGR system 100. The at least one second purge flow modulation device 140 may allow for a flow stream 121, such as but not limited to, ambient air; to flow into the of the EGR system 100.

In this second embodiment, at least one EGR purge blower 155 may be used to drive the exhaust stream 121 through the first purge vent 135. A downstream end of the first purge vent 135 may be open to atmosphere. Alternatively, the downstream end of the first purge vent 135 may be integrated with a system, such as, but not limiting of, a ventilation system that may receive the exhaust being purged from the EGR system 100.

Figure 3:
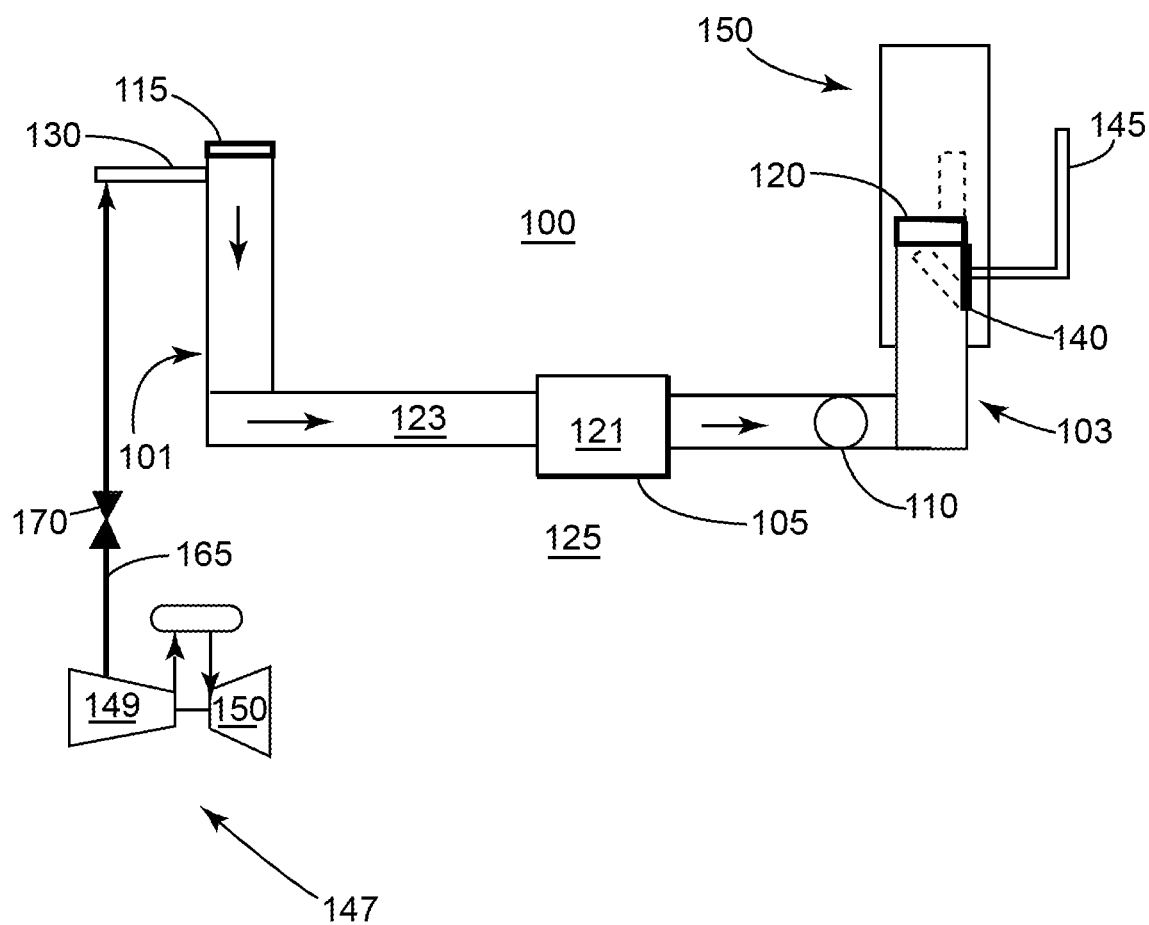
FIG. 3 is a schematic illustrating an example of a system for purging an exhaust stream in accordance with a third embodiment of an EGR purge system.
Figure 4:
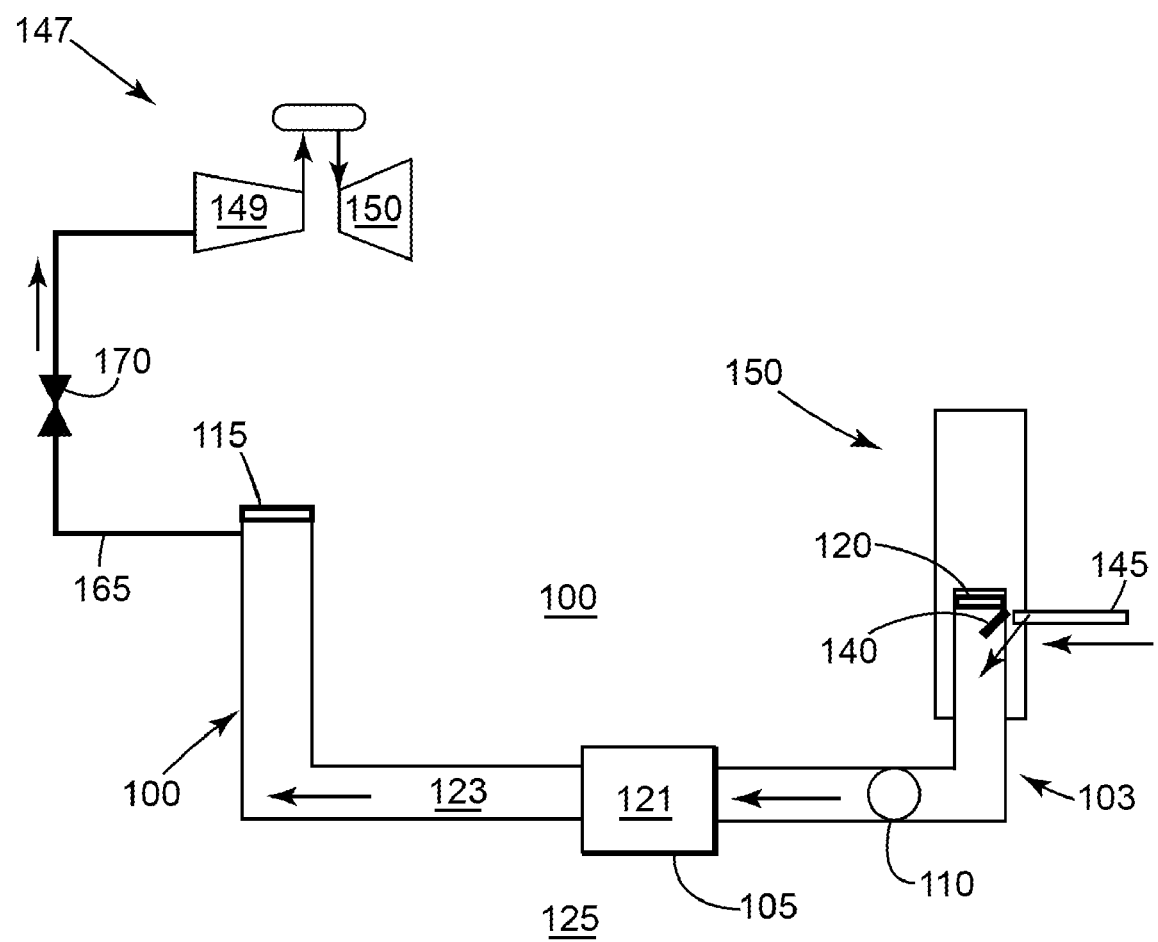
FIG. 4 is a schematic illustrating an example of a system for purging an exhaust stream in accordance with a fourth embodiment of an EGR purge system.

FIGS. 3 and 4 are alternate embodiments of the EGR purge system 125. The primary difference between FIGS. 3-4 and FIGS. 1-2 is the integration of the turbomachine 147. As discussed below, the EGR purge system 125 may be configured to allow the turbomachine 147 to either draw the exhaust stream 121 into an inlet section 149, or drive the exhaust stream 121 through the second purge vent 145.

As illustrated in FIG. 3, the turbomachine 147 in this third embodiment of the EGR purge system 125 may include an opening, such as but not limiting to, an extraction, on the compressor of the inlet section 149. The opening may allow for air to flow from the compressor, through a purge line 165 having a purge isolation device 170, to the first purge flow modulation device 130.

FIG. 4 is a schematic illustrating an example of a system for purging an exhaust stream 121 in accordance with a fourth embodiment of an EGR purge system 125. As illustrated in FIG. 4, in this fourth embodiment a portion of the purge line 165 may be integrated with the inlet section 149 of the turbomachine 147. This may allow for the inlet section 149, which typically includes a compressor, or the like, to draw the exhaust stream 121 out of the EGR system 100.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system". Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The present invention has the technical effect of controlling the operation of an EGR purge system 125.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions, which execute on the computer or other programmable, provide steps for implementing the functions/acts specified in the flowchart and/or block diagram block.

The present invention may be configured to automatically or continuously monitor the operation of the EGR system 100 to determine whether the EGR purge system 125 should operate. Alternatively, the control system may be configured to require a user action to the initiate operation of the EGR purge system 125. An embodiment of the control system of the present invention may function as a stand-alone system. Alternatively, the control system may be integrated as a module, or the like, within a broader system, such as a turbine control or a plant control system. For example, but not limiting of, the control system of the present invention may be integrated with the control system operating the EGR system 100.

The EGR purge system 125 may function when either the turbomachine 147 is not generating an exhaust that is flowing through the EGR system 100; or when the EGR system 100 in not in operation; or when a component (s) of the EGR system 100 fails; or during any time when an operator of the EGR purge system 125 decides. Generally, when the EGR system 100 is not operating, the EGR inlet damper 115 and the EGR exhaust damper 120 may close, the components of the EGR skid 105 may be de-energized, and the EGR purge fan 160 may also be de-energized. Under these (or similar) conditions, the method 500 may operate the EGR purge system 125.

Figure 5:
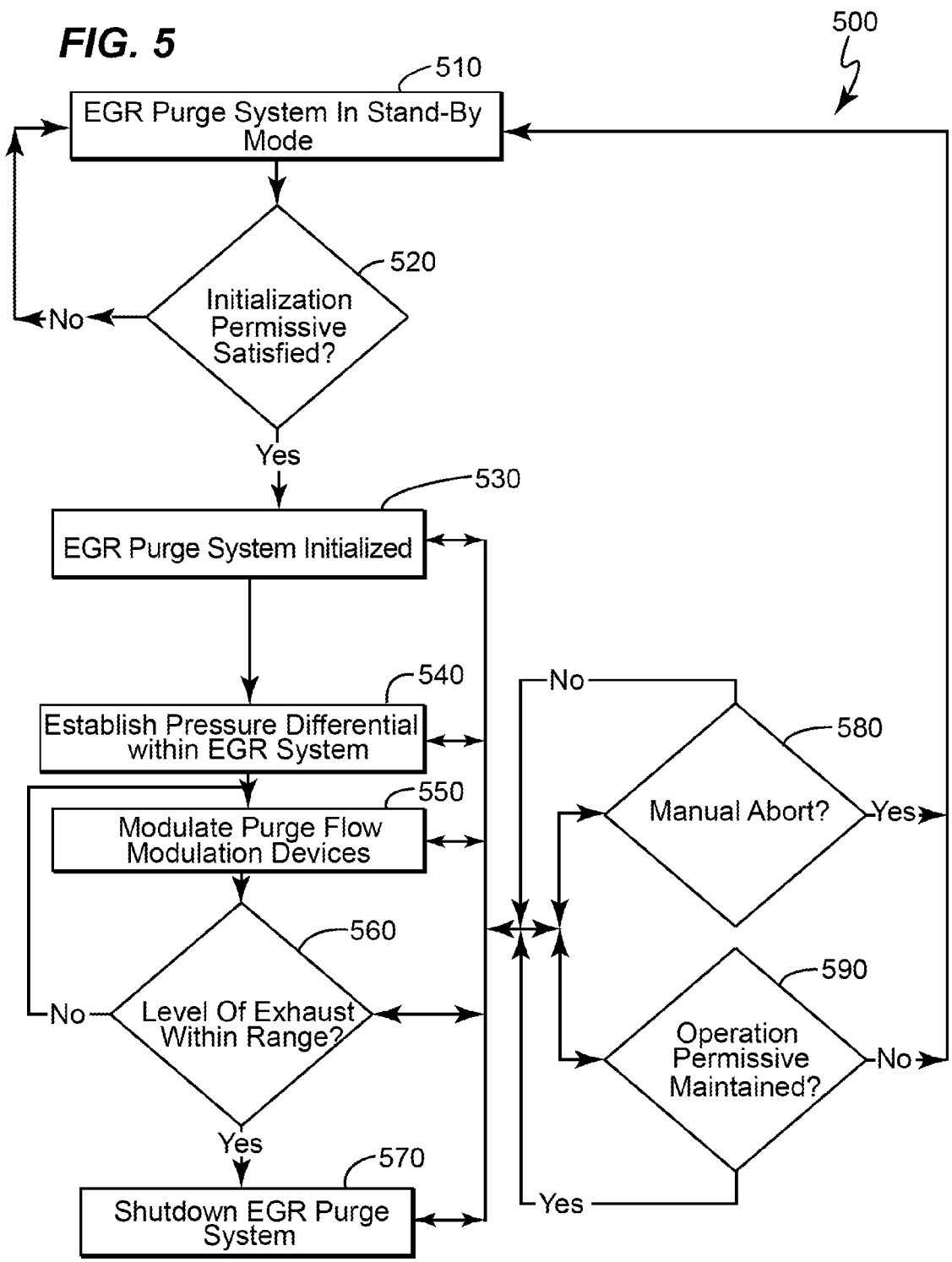
FIG. 5 is a schematic illustrating a method of controlling an EGR purge system in accordance with an embodiment of the present invention.

FIG. 5 is a schematic illustrating a method 500 of controlling an EGR purge system 125 in accordance with an embodiment of the present invention. In an embodiment of the present invention the EGR purge system 125 may be integrated with a graphical user interface (GUI), or the like. The GUI may allow the operator to navigate through the method 500 described below. The GUI may also provide at least one notification of the status of the EGR purge system 125.

In step 510, of the method 500, the EGR purge system 125 may be in a stand-by mode or the like. Here, the aforementioned components of the EGR purge system 125, (as illustrated in FIGS. 1-5), may be energized and/or otherwise prepared for use.

In step 520, the method 500 may determine whether at least one initialization permissive is satisfied. An embodiment of the present invention may require that the at least one initialization permissive is satisfied before the EGR purge system 125 begins to purge the exhaust stream 121 from the EGR system 100. The initialization permissive may generally be considered a permissive that confirms the turbomachine 147, the EGR system 100, and the EGR purge system 125 are in an operational mode allowing for the purging of the exhaust stream 121 to commence. In an embodiment of the present invention, the user may define the at least one initialization permissive.

The at least one initialization permissive may include at least one of: the turbomachine 147 is not generating the exhaust stream 121; the EGR skid 105 is not operating; and combinations thereof. If the at least one initialization permissive is satisfied then the method 500 may proceed to step 530; otherwise the method 500 may revert to step 510 until the at least one initialization permissive is satisfied.

In step 530, the method 500, may provide a notification to the user that the EGR purge system 125 is initialized and ready to purge the exhaust stream 121 from the EGR system 100. In an embodiment of the present invention, the GUI may provide the notification as a pop-up window, alarm, or other similar methods.

In step 540, the method 500, may establish a pressure differential within the EGR system 100. As discussed below, the present invention may utilize at least one of the aforementioned components of the EGR purge system 125 to create a pressure differential between the first zone 101 and the second zone 103. For example, but not limiting of, the control system of an embodiment of the present invention may operate the EGR purge fan 160 of FIG. 1 to establish the pressure differential. An embodiment of the present invention may establish from about 1 inch of water column to about 30 inches of water column between the first zone 101 and the second zone 103.

In step 550, the method 500 may modulate at least one purge flow modulation devices 130,140 in a manner allowing for the exhaust stream 121 to be purged from the EGR system 100. The following discusses how the method 500 may purge the exhaust stream 121 in each embodiment of the EGR purge system 125 illustrated in FIGS. 1-4.

Referring specifically to the embodiment illustrated in FIG. 1, the method 500 may operate the EGR purge system 125 as follows. The EGR purge fan 160 may energize and created a pressure difference of from about 1 inch of water column to about 30 inches of water column, as discussed in step 540. Next, the at least one first purge flow modulation device 130 may modulate, allowing for ambient air to enter the flow path 123. The at least one second purge flow modulation device 140 may then modulate, allowing for the exhaust stream 121 to flow out of the flow path 123. Moreover, the at least one first purge flow modulation device 130 allows for the ambient air to replace the exhaust stream 121 within the flow path 123 of the EGR system 100.

Referring specifically to the embodiment illustrated in FIG. 2, the method 500 may operate the EGR purge system 125 as follows. The EGR purge blower 155 may energize and created a pressure difference of from about 1 inch of water column to about 30 inches of water column. Next, the at least one first purge flow modulation device 130 may open, allowing for the exhaust stream 121 to flow through the first purge vent 135. Next, the at least one second purge flow modulation device 140 may then modulate, allowing for the exhaust stream 121 to flow out of the flow path 123. Moreover, the EGR purge blower 155 allows for ambient air to replace the exhaust stream 121 within the flow path 123 of the EGR system 100.

Referring specifically to the embodiment illustrated in FIG. 3, the method 500 may operate the EGR purge system 125 as follows. The turbomachine 147 may be operated in any mode allowing for air to flow through the purge line 165. The purge isolation device 170, may be modulated to allow air to flow from the inlet section 149 through the purge line 165 to the at least one first purge flow modulation device 130, which may then modulate, allowing for air to enter the flow path 123. Next, the at least one second purge flow modulation device 140 may modulate, allowing for the exhaust stream 121 to flow out of the second purge vent 145.

Alternatively, an operator may close the second flow modulation device 140, and open the EGR exhaust damper 120. This may allow for the exhaust stream 121 to flow out of the exhaust section 150 of the turbomachine 147.

The at least one first purge flow modulation device 130 allows for air from the inlet section 149 to purge the exhaust stream 121 within the flow path 123 of the EGR system 100.

Referring specifically to the embodiment illustrated in FIG. 4, the method 500 may operate the EGR purge system 125 as follows. The turbomachine 147 may be operated in any mode allowing for air to flow through the purge line 165. Here, the turbomachine 147 takes in air. Integrating the purge line 165 with the inlet section 149 may create a vacuum within the purge line 165. The at least one first purge flow modulation device 130 may then open, allowing for the exhaust stream 121 to be drawn into the purge fine 165. Next, the at least one second purge flow modulation device 140 allowing for air to be drawn into the EGR system 100, thereby purging the flow path 123 of the exhaust stream 121.

Referring back to FIG. 5, where in step 560, the method 500 may determine whether the level of exhaust in the EGR system 100 is within a range. The range may be the acceptable level of the exhaust stream 121 that may remain within the EGR system 100. An embodiment of the present invention may allow an operator of the EGR system 100 to determine the range.

Generally, the range may be the equivalent to the concentration level of the constituents within the ambient air near the turbomachine 147. For example, but not limiting of, the range may include an oxygen concentration of around 20% by volume. Moreover, the range may include a concentration level below the saturation concentration level for each of the constituents within the exhaust stream 121. If the level of the exhaust stream 121 is within the range then the method 500 may proceed to step 570; otherwise the method 500 may revert to step 530 until the exhaust stream 121 is within range.

In step 570, the method 500, may shutdown the EGR purge system 125. After the exhaust stream 121 is within the aforementioned range, the method 500 may shutdown the EGR purge system 125.

In step 580, the method 500 may allow for aborting the operation of the EGR purge system 125. As illustrated in FIG. 5, the operation of the EGR purge system 125 may be aborted after the initialization step 530. An embodiment of the present invention, may allow for a user to manually abort the operation of the EGR purge system 125. Alternatively, the method 500 may be integrated with a system that allows for the automatic aborting of the operation of the EGR purge system 125. As illustrated in FIG. 5, if the EGR purge system 125 is aborted, then the method 500 may revert to step 510, otherwise the method 500 proceeds to the next step.

In step 590 the method 500 may determine whether at least one operational permissive is maintained during the operation of the EGR purge system 125. Step 590 may be continuously monitoring the operation of the EGR purge system 125.

The operational permissive may include at least one of: the turbomachine 147 is not generating the exhaust stream 121; the EGR skid 105 is not operating; and combinations thereof. In an embodiment of the present invention, the GUI may notify the user if the operational permissive is not maintained. In an alternate embodiment of the present invention, the method 500 may automatically revert to step 510 if the operational permissive is not maintained.

Figure 6:
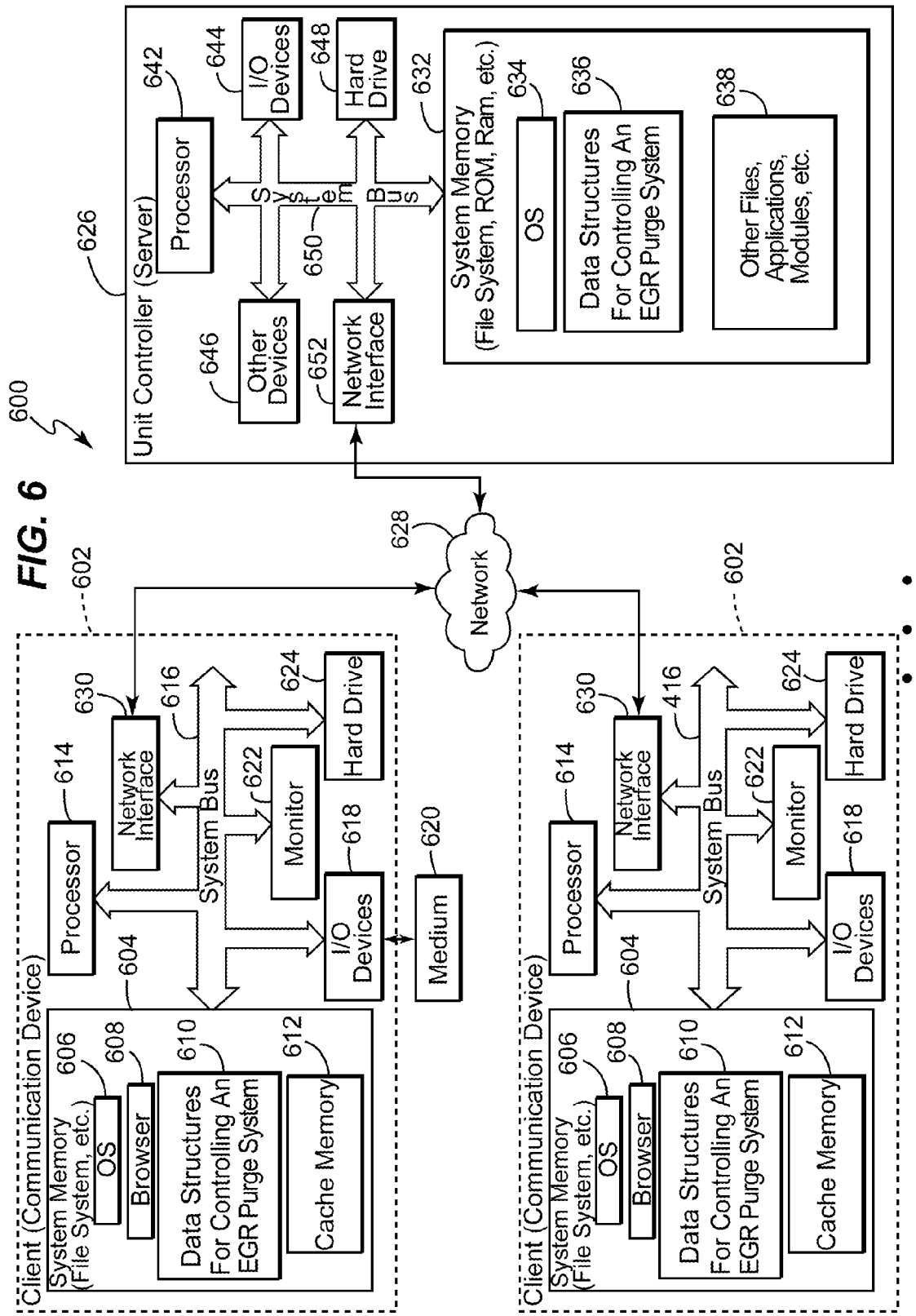
FIG. 6 is a block diagram of an exemplary system of controlling an EGR purge system in accordance with an embodiment of the present invention.

FIG. 6 is a block diagram of an exemplary system 600 of controlling an EGR purge system in accordance with an embodiment of the present invention. The elements of the method 500 may be embodied in and performed by the system 600. The system 600 may include one or more user or client communication devices 602 or similar systems or devices (two are illustrated in FIG. 6). Each communication device 602 may be for example, but not limited to, a computer system, a personal digital assistant, a cellular phone, or similar device capable of sending and receiving an electronic message.

The communication device 602 may include a system memory 604 or local file system. The system memory 604 may include for example, but is not limited to, a read only memory (ROM) and a random access memory (RAM). The ROM may include a basic input/output system (BIOS). The BIOS may contain basic routines that help to transfer information between elements or components of the communication device 602. The system memory 604 may contain an operating system 606 to control overall operation of the communication device 602. The system memory 604 may also include a browser 608 or web browser. The system memory 604 may also include data structures 610 or computer-executable code for controlling and EGR purge system that may be similar or include elements of the method 500 in FIG. 5.

The system memory 604 may further include a template cache memory 612, which may be used in conjunction with the method 500 in FIG. 5 for controlling and EGR purge system.

The communication device 602 may also include a processor or processing unit 614 to control operations of the other components of the communication device 602. The operating system 606, browser 608, and data structures 610 may be operable on the processing unit 614. The processing unit 614 may be coupled to the memory system 604 and other components of the communication device 602 by a system bus 616.

The communication device 602 may also include multiple input devices (I/O), output devices or combination input/output devices 618. Each input/output device 618 may be coupled to the system bus 616 by an input/output interface (not shown in FIG. 6). The input and output devices or combination I/O devices 618 permit a user to operate and interface with the communication device 602 and to control operation of the browser 608 and data structures 610 to access, operate and control the software to controlling and EGR purge system. The I/O devices 618 may include a keyboard and computer pointing device or the like to perform the operations discussed herein.

The I/O devices 618 may also include for example, but are not limited to, disk drives, optical, mechanical, magnetic, or infrared input/output devices, modems or the like. The I/O devices 618 may be used to access a storage medium 620. The medium 620 may contain, store, communicate, or transport computer-readable or computer-executable instructions or other information for use by or in connection with a system, such as the communication devices 602.

The communication device 602 may also include or be connected to other devices, such as a display or monitor 622. The monitor 622 may permit the user to interface with the communication device 602.

The communication device 602 may also include a hard drive 624. The hard drive 624 may be coupled to the system bus 616 by a hard drive interface (not shown in FIG. 6). The hard drive 624 may also form part of the local file system or system memory 604. Programs, software, and data may be transferred and exchanged between the system memory 604 and the hard drive 624 for operation of the communication device 602.

The communication device 602 may communicate with at least one unit controller 626 and may access other servers or other communication devices similar to communication device 602 via a network 628. The system bus 616 may be coupled to the network 628 by a network interface 630. The network interface 630 may be a modem, Ethernet card, router, gateway, or the like for coupling to the network 628. The coupling may be a wired or wireless connection. The network 628 may be the Internet, private network, an intranet, or the like.

The at least one unit controller 626 may also include a system memory 632 that may include a file system, ROM, RAM, and the like. The system memory 632 may include an operating system 634 similar to operating system 606 in communication devices 602. The system memory 632 may also include data structures 636 for controlling and EGR purge system. The data structures 636 may include operations similar to those described with respect to the method 500 for controlling and EGR purge system. The server system memory 632 may also include other files 638, applications, modules, and the like.

The at least one unit controller 626 may also include a processor 642 or a processing unit to control operation of other devices in the at least one unit controller 626. The at least one unit controller 626 may also include I/O device 644. The I/O devices 644 may be similar to I/O devices 618 of communication devices 602. The at least one unit controller 626 may further include other devices 646, such as a monitor or the like to provide an interface along with the I/O devices 644 to the at least one unit controller 626. The at least one unit controller 626 may also include a hard disk drive 648. A system bus 650 may connect the different components of the at least one unit controller 626. A network interface 652 may couple the at least one unit controller 626 to the network 628 via the system bus 650.

The flowcharts and step diagrams in the figures illustrate the architecture, functionality, and operation of possible implementations of systems, methods, and computer program products according to various embodiments of the present invention. In this regard, each step in the flowchart or step diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the step diagrams and/or flowchart illustration, and combinations of steps in the step diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of purging an exhaust stream from and exhaust gas recirculation (EGR) system, wherein the exhaust stream exits a gas turbine; the method comprising:
    providing the gas turbine comprising: an inlet, an external combustion system, and an exhaust section;
        wherein the gas turbine operatively produces an exhaust stream;
    providing the EGR system comprising: a first zone, a second zone; an EGR skid, an EGR inlet damper, and an EGR outlet damper;
        wherein the EGR system reduces the level of a constituent within the exhaust stream and facilitates the sequestration and removal of concentrated CO2;
    providing an EGR purge system for purging the exhaust stream from the EGR system, the EGR purge system comprising: a first purge flow modulation device located within the first zone, and a second purge flow modulation device located within the second zone;
        wherein first purge flow modulation device and the second purge flow modulation device move a begin fluid through the EGR system to remove remnants of the exhaust stream remaining when the EGR system is not in operation;
    establishing a pressure differential between the first zone and the second zone of the EGR system;
    modulating the first purge flow modulation device and the second purge flow modulation device to allow for the exhaust stream to exit the EGR system; and
    determining whether an oxygen concentration of air within the EGR system is within a range.

2. The method of claim 1, further comprising determining whether at least one initialization permissive is complete.

3. The method of claim 2, wherein the at least one initialization permissive comprises at least one of: the turbomachine is not generating the exhaust stream; the EGR skid is not operating; and combinations thereof.

4. The method of claim 1, further comprising determining whether at least one operational permissive is complete.

5. The method of claim 4, wherein the at least one operational permissive comprises at least one of: turbomachine is not generating the exhaust stream; the EGR skid is not operating; and combinations thereof.

6. The method of claim 1, wherein the method allows for aborting the operation of the EGR purge system.

7. The method of claim 1, further comprising shutting down the EGR purge system after the exhaust stream is within the range of an acceptable level of the exhaust stream that remains within the EGR system.

8. The method of claim 1, wherein the step of establishing the pressure differential comprises operating an EGR purge fan to establish the pressure differential from about 1 inch of water column to about 30 inches of water column between the first zone and the second zone.

9. The method of claim 1, wherein the step of establishing the pressure differential between the first zone and second zone comprises operating an air source that drives the exhaust stream out of the EGR system.

10. The method of claim 9, wherein the air source comprises at least one of: an EGR blower, an EGR purge fan, the turbomachine, and combinations thereof.

11. A system for purging an exhaust stream from an exhaust gas recirculation (EGR) system, wherein the exhaust stream exits a gas turbine; the system comprising:
   the gas turbine comprising: an inlet, an external combustion system, and an exhaust section;
      wherein the gas turbine operatively produces an exhaust stream;
   the EGR system comprising: a first zone, a second zone; an EGR skid, an EGR inlet damper, and an EGR outlet damper;
      wherein the EGR system reduces the level of a constituent within the exhaust stream and facilitates the sequestration and removal of concentrated CO2;
   an EGR purge system for purging the exhaust stream from the EGR system, the EGR purge system comprising: a first purge flow modulation device located within the first zone, and a second purge flow modulation device located within the second zone;
      wherein the first purge flow modulation device and the second purge flow modulation device move a begin fluid through the EGR system to remove remnants of the exhaust stream remaining hen the EGR system is not in operation;
   a control system, wherein the control system comprises a processor that operates the first purge flow modulation device located within the first zone, and second purge flow modulation device located within the second zone of the EGR purge system to:
      establish a pressure differential between the first zone and the second zone of the EGR system;
      move the exhaust stream out of the EGR system; and
      determine whether the exhaust stream is within a range.

12. The system of claim 11, wherein the processor determines whether at least one initialization permissive is complete.

13. The system of claim 12, wherein the at least one initialization permissive comprises at least one of: the turbomachine is not generating the exhaust stream; the EGR skid is not operating; and combinations thereof.

14. The system of claim 11, wherein the processor determines whether at least one operational permissive is complete.

15. The system of claim 14, wherein the at least one operational permissive comprises at least one of: turbomachine is not generating the exhaust stream; the EGR skid is not operating; and combinations thereof.

16. The system of claim 11, wherein the processor aborts the operation of the EGR purge system.

17. The system of claim 11 wherein the processor shuts down the EGR purge system after the exhaust stream is within the range an acceptable level of the exhaust stream that remains within the EGR system.

18. The system of claim 11, wherein the control system operates an EGR purge fan to establish the pressure differential between the first zone and the second zone in a range of from about 1 inch of water column to about 30 inches of water column.

19. The system of claim 11, wherein the EGR purge system further comprises an air source that operates to remove the exhaust stream from the EGR system.

20. The system of claim 19, wherein the air source comprises at least one of: an EGR blower, an EGR purge fan, the turbomachine, and combinations thereof.

* * * * *